(12) United States Patent
Poncelet et al.

(10) Patent No.: US 9,169,428 B2
(45) Date of Patent: Oct. 27, 2015

(54) USE OF COMPOSITION AS AN ANTIFREEZE AGENT

(75) Inventors: Olivier Poncelet, Grenoble (FR); Daniel Getto, Le Fontanil (FR); Julien Jouhannaud, Volgre (FR)

(73) Assignee: Commissariat A L'Energie Atomique Et Aux Energies Alternatives, Paris (FR)

(*) Notice: Subject to any disclaimer, the term of this patent is extended or adjusted under 35 U.S.C. 154(b) by 0 days.

(21) Appl. No.: 14/111,902

(22) PCT Filed: Apr. 12, 2012

(86) PCT No.: PCT/IB2012/051804
§ 371 (c)(1),
(2), (4) Date: Oct. 15, 2013

(87) PCT Pub. No.: WO2012/140600
PCT Pub. Date: Oct. 18, 2012

(65) Prior Publication Data
US 2014/0027668 A1    Jan. 30, 2014

(30) Foreign Application Priority Data
Apr. 15, 2011    (FR) .................................. 11 53303

(51) Int. Cl.
*C09K 5/00*  (2006.01)
*C09K 5/20*  (2006.01)
*C08L 71/02* (2006.01)

(52) U.S. Cl.
CPC . *C09K 5/20* (2013.01); *C08L 71/02* (2013.01); *C08G 2650/50* (2013.01)

(58) Field of Classification Search
None
See application file for complete search history.

(56) References Cited

U.S. PATENT DOCUMENTS

| 5,330,670 | A | 7/1994 | Turcotte et al. | |
|---|---|---|---|---|
| 6,228,283 | B1 * | 5/2001 | Turcotte et al. | 252/76 |
| 2013/0037048 | A1 * | 2/2013 | Edgington et al. | 134/4 |

FOREIGN PATENT DOCUMENTS

| FR | 2 922 448 | | 4/2009 |
|---|---|---|---|
| FR | 2922448 | * | 4/2009 |

OTHER PUBLICATIONS

Gundlach and Burden, "Lower Critical Solution Temperature (LCST) Polymer Solution for Clear/Cloud Glazing Applications", *Journal Applied Polymer Science*, 51(14):731-736, 1994.
International Search Report and Written Opinion issued in PCT Application No. PCT/IB2012/051804, mailed Aug. 8, 2012.

* cited by examiner

*Primary Examiner* — Necholus Ogden, Jr.
(74) *Attorney, Agent, or Firm* — Norton Rose Fulbright US LLP

(57) ABSTRACT

The present invention relates to the use, as an antifreeze agent, of a composition containing a polymer chosen from polyetheramines having a critical solubility temperature in water, referred to as LCST, ranging from 20 to 80° C. and also compositions, in particular of coolant type, comprising a polymer having a critical solubility temperature in water ranging from 20 to 80° C.

13 Claims, 1 Drawing Sheet

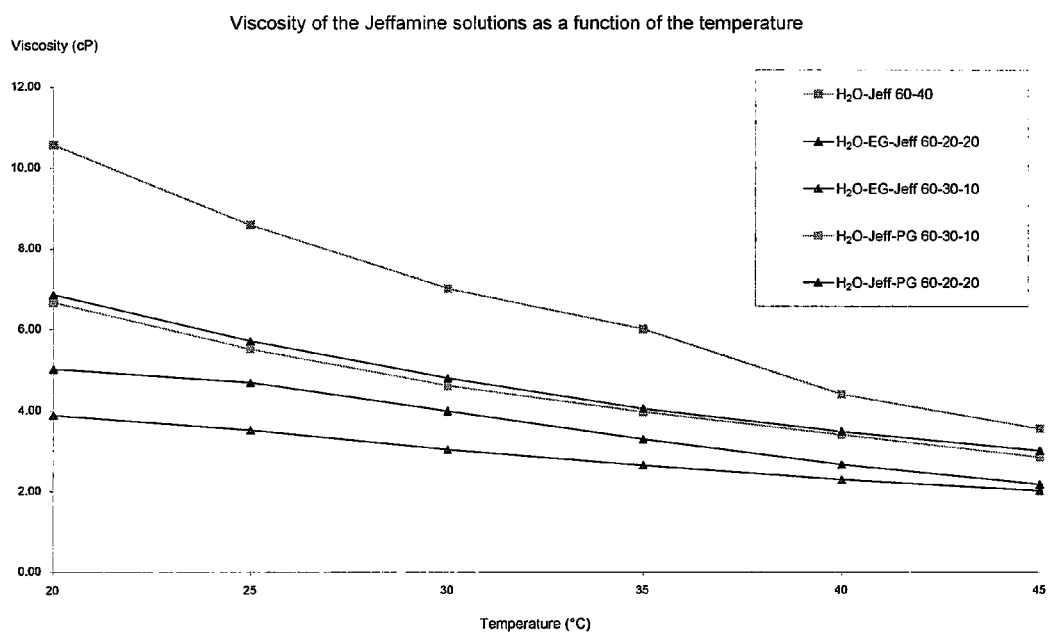

USE OF COMPOSITION AS AN ANTIFREEZE AGENT

CROSS-REFERENCE TO RELATED APPLICATIONS

This application is a national phase application under 35 U.S.C. §371 of International Application No. PCT/IB2012/051804 filed 11 Apr. 2012, which claims priority to French Patent Application No. 1153303 filed 15 Apr. 2011. The entire contents of each of the above-referenced disclosures is specifically incorporated herein by reference without disclaimer.

The present invention relates to the use as antifreeze agent of a composition comprising at least one polymer exhibiting an LCST (Lower Critical Solution Temperature) ranging from 20 to 80° C.

The field of the invention is more particularly that of antifreeze additives for compositions of cooling liquid type and in particular additives dedicated to use in the motor vehicle, electronics or electrical engineering fields.

For motor vehicle cooling applications, the fluids used are typically mixtures of 60% by volume of water and of 40% by volume of glycol.

The presence of a glycol in water, such as ethylene glycol or propylene glycol, makes it possible to prevent a cooling fluid from freezing during storage at low temperature. These glycols would also have an effect for protecting against the corrosion of the walls of the exchangers, on contact with these cooling liquids.

However, the presence of glycol in water has a major disadvantage of significantly reducing the thermal conductivity of the new fluid thus obtained. This is because, as the thermal conductivity of distilled water is 0.608 $W.m^{-1}.K^{-1}$ for distilled water and 0.208 $W.m^{-1}.K^{-1}$ for a glycol, it follows that the thermal conductivity of a mixture of 60% by volume of water and of 40% by volume of ethylene glycol is only 0.40 $W.m^{-1}.K^{-1}$, i.e. a value lower by approximately 30% of that of water.

In point of fact, the higher the thermal conductivity of a fluid, the faster the fluid will be capable "of exchanging" heat, at a constant flow rate.

The thermal conductivity performance of the fluid thus has a direct impact on the volume of the cooling liquid tank, in particular on the saving in weight or space, but also on the recirculation pumps, which will be less powerful (overall energy balance).

Consequently, the use of glycol(s) as antifreeze additive has the major disadvantage of generating an additional cost in electrical consumption of the recirculation pumps or in scaling of a plant, the weight and the bulk being additional thereto.

There thus currently remains a need for an antifreeze additive which makes it possible to guarantee maintenance of the low-temperature fluidity of the fluids in which it is present with a thermal conductivity as close as possible to that of water.

It is a specific object of the present invention to meet this need.

Thus, according to one of its aspects, the present invention relates to the use as antifreeze agent of a composition comprising at least one polymer exhibiting a lower critical solution temperature, referred to as LCST, ranging from 20 to 80° C.

More particularly, the present invention relates to the use as antifreeze agent of a composition comprising at least one polymer chosen from polyetheramines exhibiting a lower critical solution temperature, referred to as LCST, ranging from 20 to 80° C.

According to an alternative embodiment, the polymer under consideration according to the invention is employed in an aqueous solution.

The LCST polymers under consideration according to the invention are thus polymers which, by reversible (hydrophilic/hydrophobic) phase change mechanism, separate from the water when the temperature of the fluid begins to heat above 20° C., thus creating a colloidal sol of hydrophobic particles. This phase change temperature is referred to as LCST (Lower Critical Solution Temperature).

Unexpectedly, the inventors have found that the use for antifreeze purposes of such a polymer, that is to say a polymer capable of undergoing a reversible hydrophilic/hydrophobic phase change in response to a rise in temperature, makes it possible to be liberated from the significant decrease in the thermal conductivity observed with conventional antifreezes of glycol type.

More specifically, below 20° C., the polymer shows a very high affinity for water, which renders it completely soluble, and, above this same temperature, there is phase separation.

The direct consequence of the formation of this two-phase medium is a significant increase in the concentration by volume of water in the mixture and consequently in the thermal conductivity of the mixture, which then becomes virtually equal to that of distilled water. During the cooling of this same aqueous fluid and more particularly during the adjustment of the temperature of the colloidal suspension to a temperature below 20° C., the system becomes single-phase again.

The phenomenon is described in greater detail in the examples which follow and which show that, for aqueous compositions comprising a compound exhibiting an LCST, the thermal conductivities measured significantly increase when the temperature is greater than its LCST. For example, an aqueous composition comprising a polymer, such as a polyetheramine, exhibiting an LCST at 32° C. shows a thermal conductivity greater by 16%, with respect to the 60% $H_2O$ and 40% propylene glycol mixture at 45° C.

The use of a polymer in accordance with the invention as antifreeze additive in addition has an additional advantage in terms of viscosity.

It is known that the addition of an organic compound always results in an increase in viscosity. This increase in viscosity is proportional to the molar mass of the compound added and to its percentage by volume. This reflects the Newtonian behavior of the fluid. An increase in the temperature will result in a linear fall in the viscosity.

In point of fact, polymers having an LCST have the distinguishing feature of not exhibiting the same rheological behavior below and above the hydrophilic/hydrophobic transition temperature.

Below, they have a Newtonian behavior, whereas, above, they will have a non-Newtonian behavior with a fall in viscosity.

Insofar as it is always advantageous energetically to retain the lowest possible viscosity for the fluid, the use of a heat-sensitive additive, such as LCST polymers, in an aqueous composition is thus also advantageous as such.

According to another of its aspects, the present invention relates to an aqueous composition, of use as antifreeze agent, comprising at least one polymer exhibiting a lower critical solution temperature, referred to as LCST, ranging from 20 to 80° C. and at least one alcohol.

According to a preferred form, such a composition is dedicated to being diluted with water before use.

More particularly, the present invention relates to an aqueous composition, of use as antifreeze agent, comprising from 20% to 50% by volume weight of at least one polymer exhibiting a lower critical solution temperature, referred to as LCST, ranging from 20 to 80° C. and at least one alcohol.

According to a preferred form, the present invention relates to an aqueous composition as defined above in which the polymer exhibits a lower critical solution temperature, referred to as LCST, ranging from 25 to 50° C., preferably from 30 to 45° C., indeed even from 30 to 40° C.

Preferably, the present invention relates to an aqueous composition as defined above, in which the polymer is chosen from polyetheramines, poly(N-isopropylacrylamide)s, polyvinylcaprolactams, poly(vinyl methyl ether)s, polyoxazolines and hydroxyalkylcelluloses, and their copolymers.

In particular, the present invention relates to an aqueous composition, of use as antifreeze agent, comprising from 20% to 50% by volume weight of at least one polymer chosen from polyetheramines and at least one alcohol.

Preferably, the present invention relates to an aqueous composition as defined above, in which the polymer is O-(2-aminopropyl)-O'-(2-methoxyethyl)polypropylene glycol.

Polymers Exhibiting a Lower Critical Solution Temperature, Referred to as LCST, Ranging from 20 to 80° C.

As mentioned above, a composition according to the invention comprises at least one polymer exhibiting a lower critical solution temperature, referred to as LCST, ranging from 20 to 80° C.

"Lower critical solution temperature" or "LCST" is understood to mean the critical temperature above which the polymer loses its solubility in water and below which it becomes soluble in water. According to the invention, this process is reversible.

More particularly, the polymer used in the context of the present invention exhibits a lower critical solution temperature, referred to as LCST, ranging from 25 to 50° C., preferably from 30 to 45° C., indeed even from 30 to 40° C.

From the viewpoint of their ability to change according to the temperature of their use in an aqueous medium, the polymers under consideration according to the invention are noncrosslinked.

Advantageously, the polymer exhibiting a lower critical solution temperature, referred to as LCST, ranging from 20 to 80° C. can be chosen from:
polyetheramines,
poly(N-isopropylacrylamide)s,
polyvinylcaprolactams,
poly(vinyl methyl ether)s,
polyoxazolines,
hydroxyalkylcelluloses,
noncrosslinked homopolymers or copolymers of monomers comprising at least one ether group, such as poly(ethylene oxide),
noncrosslinked homopolymers or copolymers of monomers comprising at least one alcohol group, such as poly(hydroxyalkyl acrylate)s,
polyvinyl alcohol and its derivatives,
poly(dimethylaminoethyl methacrylate)s, and
their copolymers.

Very particularly suitable for the invention are polyetheramines, poly(N-isopropylacrylamide)s, polyvinylcaprolactams, poly(vinyl methyl ether)s, polyoxazolines and hydroxyalkylcelluloses, and their copolymers.

Mention may more particularly be made, as polyetheramines and their copolymers suitable for the invention, of monoamine polyetheramines and more particularly O-(2-aminopropyl)-O'-(2-methoxyethyl)polypropylene glycol which exhibits an LCST at 32° C.

Use may be made, as polyetheramines very particularly suitable for the invention, for example, of those sold under the Jeffamine® M-600® or XTJ-505®, Jeffamine® M-1000® or XTJ-506®, Jeffamine® M-2005® and Jeffamine® M-2070® names, sold by Huntsman.

Mention may more particularly be made, as poly(N-isopropylacrylamide)s and their copolymers suitable for the invention, in particular of those exhibiting a molecular weight of greater than 200 and less than 50000, such as noncrosslinked homopolymers or copolymers of monomers comprising an amide group, such as poly(N-substituted acrylamide)s, poly(N-isopropylacrylamide) homopolymers, copolymers of N-isopropylacrylamide and of $C_1$-$C_{18}$ (meth)acrylate (for example, butyl acrylate) and copolymers of N-isopropylacrylamide and of methacrylic acid.

Mention may more particularly be made, as polyoxazolines and their copolymers suitable for the invention, of poly(N-alkyloxazoline)s with a molecular weight of greater than 200 and less than 50000, such as the N-ethyl/N-propyl or N-isopropyl copolymers.

Mention may more particularly be made, as hydroxyalkylcelluloses and their copolymers suitable for the invention, of hydroxypropylmethylcelluloses, ethylhydroxyethylcellulose, hydroxyethylcellulose, hydroxypropylcellulose and methylcellulose.

According to an alternative embodiment, the polymer is a polymer chosen from poly(N-substituted acrylamide)s, poly(N-isopropylacrylamide) homopolymers, copolymers of N-isopropylacrylamide and of $C_1$-$C_{18}$ (meth)acrylate (for example, butyl acrylate), copolymers of N-isopropylacrylamide and of methacrylic acid, and O-(2-aminopropyl)-O'-(2-methoxyethyl)polypropylene glycol.

Preferably, the polymer is chosen from polyetheramines.

In particular, the polymer is O-(2-aminopropyl)-O'-(2-methoxyethyl)polypropylene glycol.

This polyetheramine is sold in particular under the Jeffamine® M-600® or XTJ-505® names, sold by Huntsman.

According to a preferred embodiment, the composition according to the invention is aqueous and comprises from 20% to 50% by volume weight of the polymer exhibiting a lower critical solution temperature, referred to as LCST, ranging from 20 to 80° C.

As already mentioned, the thermal conductivities measured for the aqueous compositions comprising a compound exhibiting an LCST ranging from 20 to 80° C. increase significantly above the LCST.

The thermal conductivity is measured by the hot filament technique using the Lambda 1® apparatus sold by F5Tech.

The polymer exhibiting an LCST ranging from 20 to 80° C. can be employed for antifreeze additive purposes as such or in a form combined with a conventional antifreeze additive, such as, for example, an alcohol and more particularly a glycol, as defined below.

Alcohol

As specified above, the use of a polymer in accordance with the invention does not rule out the concomitant use of a conventional additive.

Thus, the present invention is also targeted at an aqueous composition, of use as antifreeze agent, comprising at least one polymer exhibiting a lower critical solution temperature, referred to as LCST, ranging from 20 to 80° C. and at least one alcohol.

However, the choice of this additive as well as its amounts will be adjusted so as not to affect, at least significantly, the gain in thermal conductivity provided by the polymer exhibiting an LCST.

Mention may very particularly be made, by way of representation of these additives, of alcohols.

Mention may in particular be made, among alcohols, of monoalcohols and polyalcohols.

Mention may in particular be made, by way of representation of the monoalcohols suitable for the invention, of those chosen from methyl alcohol, ethyl alcohol, propyl alcohol, isopropyl alcohol and their mixtures.

Mention may in particular be made, as polyalcohols very particularly suitable for the invention, of glycols.

"Glycol" should be understood as meaning, within the meaning of the present invention, any organic molecule comprising at least two free hydroxyl groups.

A glycol suitable for the invention can be a compound of saturated or unsaturated and linear, branched or cyclic alkyl type carrying, on the alkyl chain, at least two —OH functional groups, in particular at least three —OH functional groups.

The glycols advantageously suitable for the formulation of the compositions according to the present invention are those exhibiting in particular from 2 to 16 carbon atoms, preferably from 2 to 4 carbon atoms.

Advantageously, the glycol can, for example, be chosen from ethylene glycol, diethylene glycol, propylene glycol, dipropylene glycol, 1,3-propanediol, polyethylene glycol, butylene glycol, isoprene glycol, pentylene glycol, hexylene glycol, glyceryl triacetate and their mixtures.

According to a preferred embodiment, the alcohol is a glycol.

In particular, the glycol is chosen from ethylene glycol, diethylene glycol, propylene glycol, dipropylene glycol and their mixtures.

Preferably, the glycol is chosen from ethylene glycol and propylene glycol.

More particularly, in a composition according to the invention, the polymer and the alcohol, more particularly the glycol, are present in a polymer(s)/alcohol(s) ratio by volume of greater than or equal to 0.1, more particularly varying from 0.3 to 3 and preferably equal to 1.

Of course, a composition under consideration according to the invention in addition advantageously comprises one or more additive(s).

Additives

As specified above, a composition according to the invention can additionally comprise any additive normally employed with an antifreeze additive.

The choice of this additional additive can also be conditioned by the nature of the fluid to which it is dedicated to being added, indeed even the field of application of this fluid.

Generally, this additional additive can be chosen in particular from antifoaming agents, colorants, biocides, buffering agents, corrosion inhibitors and their mixtures.

Mention may in particular be made, by way of illustration of antifoaming agents, of polysiloxanes, oxyalkylated polysiloxanes and amides of fatty acids resulting from vegetable or animal oils.

Mention may in particular be made, by way of illustration of corrosion inhibitors, of those chosen from the group consisting of amines, succinimides, alkenylsuccinimides, polyalkylamines, polyetheramines and polyalkylpolyamines. They can also be alkali metal salts of nitrates, of carbonates or of silicates.

Mention may in particular be made, by way of illustration of biocides, of bacteriostats and/or bactericides or fungistats and/or fungicides.

Of course, a person skilled in the art will take care to choose the optional additional ingredients and/or their amounts so that the advantageous properties of the composition according to the invention are not, or not substantially, detrimentally affected by the envisioned addition.

The invention is illustrated in more detail by the examples described below, given by way of illustration and without a limiting nature.

The percentages are percentages by volume.

In the examples which follow, the percentages by volume are shown with respect to the total weight of the composition.

EXAMPLES

Example 1

Effect of an LCST Polymer According to the Invention in Terms of Thermal Conductivity The LCST polymer used is O-(2-aminopropyl)-O'-(2-methoxyethyl)-polypropylene glycol, sold under the Jeffamine® M-600® name by Huntsman, which exhibits an LCST at 32° C.

Aqueous compositions were prepared starting from this polymer, at different concentrations, in the presence or absence of a glycol.

The glycols used are ethylene glycol and propylene glycol, sold by Aldrich and Fluka.

Control compositions, that is to say without LCST polymer, with one of the abovementioned glycols, were prepared in parallel.

Each of the compositions tested is respectively brought to the temperatures of 25° C. and then 45° C. in a jacketed reactor connected to a Julabo thermo-cryostat and their thermal conductivity is evaluated at each of these two temperatures.

The thermal conductivities are measured by the hot filament technique on a Lambda System 1® apparatus sold by F5 Technology.

The composition of the formulations prepared are reported in the table below, which also shows the change in the thermal conductivity as a function of the temperature.

| | Thermal conductivity K at 25° C. in mW · K$^{-1}$ · m$^{-1}$ | Thermal conductivity K at 45° C. (T > LCST) in mW · K$^{-1}$ · m$^{-1}$ |
|---|---|---|
| Control composition 1: 100% H$_2$O | 560 | 570 |
| Control composition 2: 60% H$_2$O and 40% Ethylene Glycol | 420 | 420 |
| Control composition 3: 60% H$_2$O and 40% Propylene Glycol | 375 | 375 |
| Composition 4 according to the invention: 60% H$_2$O and 40% Jeffamine ® M-600 ® | 360 | 481 |
| Composition 5 according to the invention: 60% H$_2$O, 20% Ethylene Glycol and 20% Jeffamine ® M-600 ® | 390 | 410 |
| Composition 6 according to the invention: 60% H$_2$O, 20% Propylene Glycol and 20% Jeffamine ® M-600 ® | 370 | 480 |

It may be observed that the increase in the thermal conductivity of the control compositions with the temperature is very low, indeed even nonexistent.

On the other hand, the thermal conductivities measured for the compositions according to the invention vary greatly as a function of the temperature.

Thus, the addition of 20% by volume of Jeffamine® M-600® shows a thermal conductivity greater by 16% with respect to the 60% $H_2O$ and 40% Propylene Glycol mixture at 45° C.

Example 2

Effect of an LCST Polymer According to the Invention in Terms of Rheological Behavior Compositions 4 to 6 of example 1 as well as the two compositions which follow were tested for their rheological performance as a function of the temperature, Composition 7 according to the invention: 60% $H_2O$, 30% Ethylene Glycol and 10% Jeffamine® M-600® ($H_2O$-EG-Jeff 60-30-10)

Composition 8 according to the invention: 60% $H_2O$, 20% Propylene Glycol and 20% Jeffamine® M-600® ($H_2O$-Jeff-PG 60-20-20).

The curves representing the viscosity as a function of the temperature of the compositions 4 to 8 are described in FIG. 1.

The compositions no longer exhibit the same rheological behavior below and above the hydrophilic/hydrophobic transition temperature of the polymer under consideration in the composition.

A fall in the viscosity with the increase in the temperature is noticed.

The invention claimed is:

1. An aqueous antifreeze composition comprising from 20% to 50% by volume of at least one polymer exhibiting a lower critical solution temperature (LCST) of from 20 to 80° C. and at least one alcohol, wherein the polymer and the alcohol are present in a polymer(s)/alcohol(s) ratio by volume of greater than or equal to 0.1, wherein the polymer is chosen from polyetheramines, poly(N-isopropylacrylamide)s, polyvinylcaprolactams, poly(vinyl methyl ether)s, polyoxazolines and hydroxyalkylcelluloses, and their copolymers.

2. The composition of claim 1, wherein the LCST is from 25 to 50° C.

3. The composition of claim 1, wherein the polymer is a polyetheramine.

4. The composition of claim 1, wherein the polymer is O-(2-aminopropyl)-O'-(2-methoxyethyl)polypropylene glycol.

5. The composition of claim 1, wherein the alcohol is a glycol.

6. The composition of claim 5, wherein the glycol is ethylene glycol or propylene glycol.

7. The composition of claim 1, further comprising at least one of an antifoaming agent, colorant, biocide, buffering agent, and/or corrosion inhibitor.

8. The composition of claim 1, further defined as being adapted to being diluted with water before use.

9. A method comprising:
obtaining a composition of claim 1 and;
using the composition as cooling liquid.

10. The method of claim 9, further defined as using the composition in a motor vehicle.

11. The method of claim 9, further defined as using the composition in electronics.

12. The method of claim 9, further defined as using the composition in an electrical engineering field.

13. The composition of claim 1, wherein the composition is a cooling liquid.

* * * * *